United States Patent

Luft

[15] 3,700,891
[45] Oct. 24, 1972

[54] DEVICE FOR THE NONDISPERSIVE INFRARED GAS ANALYSIS

[72] Inventor: Karl Friedrich Luft, am Wunnesberg 32, Essen, Germany

[22] Filed: May 12, 1971

[21] Appl. No.: 142,616

Related U.S. Application Data

[63] Continuation-in-part of Ser. No. 745,197, July 16, 1968, abandoned.

[52] U.S. Cl.................................250/43.5 R, 356/95
[51] Int. Cl................................................G01n 21/26
[58] Field of Search....................250/43.5 R; 356/95

[56] References Cited

UNITED STATES PATENTS 3,227,873    1/1966    Liston.......................250/43.5

*Primary Examiner*—James W. Lawrence
*Assistant Examiner*—C. E. Church
*Attorney*—Malcolm W. Fraser

[57] ABSTRACT

This invention comprises a device for detecting and measuring a gas component of a gas mixture using the optical-pneumatic effect produced by absorption of infrared radiation by a gas. The device comprises, in optical alignment, a radiation source, filter means, a cuvette system and a receiver unit which contains a measuring chamber and a comparison chamber. Pressure differential means such as a diaphragm condenser measures the optical-pneumatic effect produced by the absorption of radiation. The device is provided with porous means for flow of gases to eliminate interfering fluctuations in gas flow.

8 Claims, 4 Drawing Figures

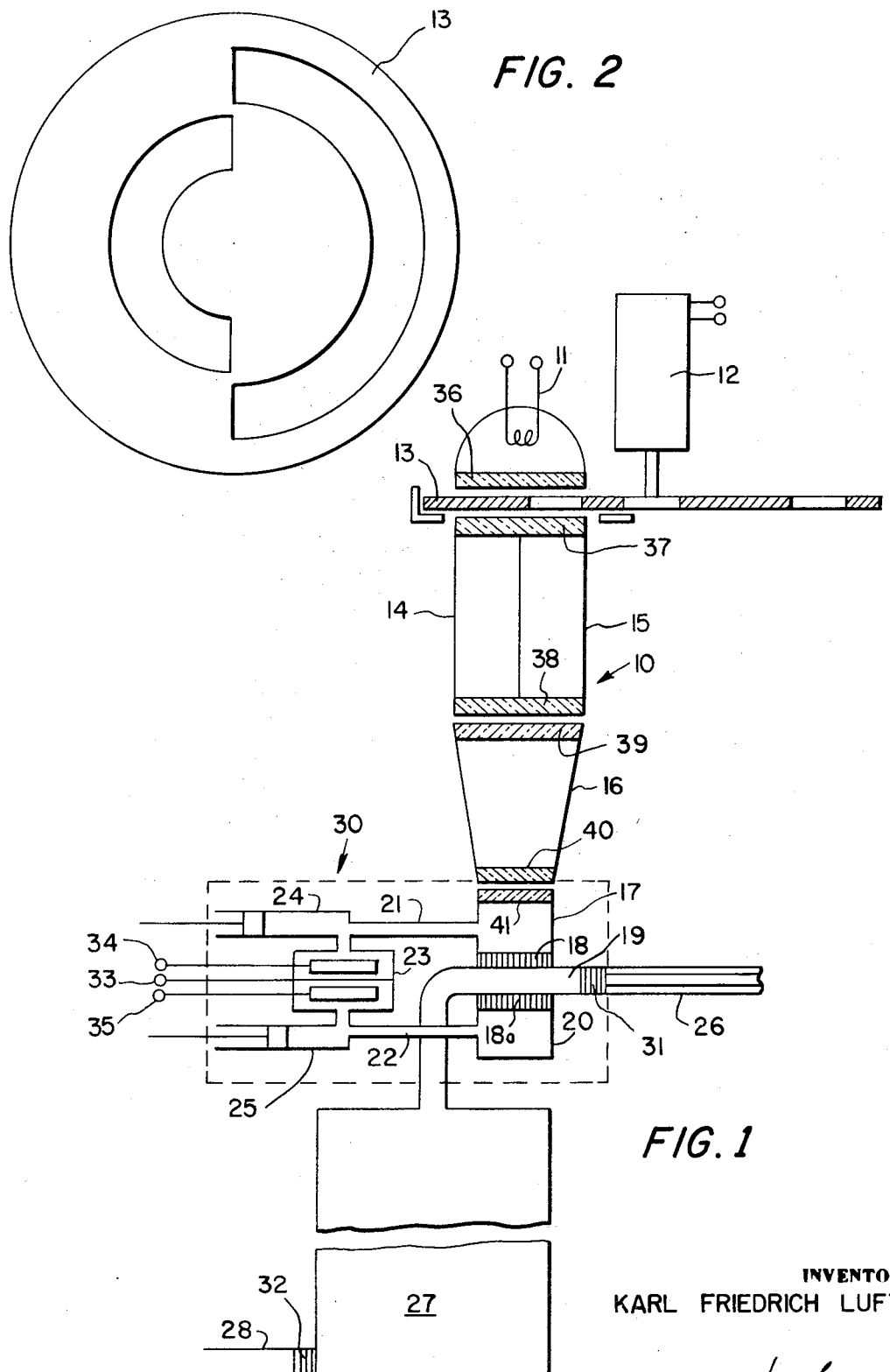

DEVICE FOR THE NONDISPERSIVE INFRARED GAS ANALYSIS

This application is a continuation-in-part application of copending application Ser. No. 745,197, filed July 16, 1968 now abandoned.

BACKGROUND OF THE INVENTION

This invention relates to a device for the analysis of gas mixtures and more particularly, to a device for measurement of the optical-pneumatic effect produced through the absorption of infrared radiation in a gas mixture.

The optical-pneumatic effect has been known since the experiments of Tyndall and Röntgen. In many fields of technology, nondispersive, infrared gas analysis has been employed and is successful in the detection of an individual component in a gaseous mixture. Attempts have been made to broaden the measuring method in such a manner that the determination of several components of a gaseous mixture by the use of one apparatus becomes possible. One such device employed rotatably mounted filters and analysis chambers to determine three components in a gaseous mixture [K.F. Luft, "Angew. Chem.," Applied Chemistry, Edition B, p. 19, 2/12 (1947)]. In another device, several receivers disposed in series in the same beam path exhibiting selectivity to various gases are employed. A similar device adapted only to the measuring of two components has been marketed for some time [K.F. Luft, Z. Analyt. Chem. p. 164, 108 (1958)].

Although the above devices had some advantages, multicomponent devices for gas analysis have not been particularly successful in view of the large number of one-component measuring devices on the market.

In British Pat. No. 953,952, a gas mixture to be analyzed flows in two equal streams into two measuring chambers of equal size through capillaries. By means of modulated irradiation which is absorbed in the measuring chambers, a pressure difference occurs which is detected by a membrane condenser. However, the capillaries are difficult to synchronize and install in exactly the same manner to avoid unavoidable fluctuations of the flow of the gases, which produces interfering pressure differences at the condenser.

Today, various analytical methods are available, using gas chromotography and mass spectroscopy, which provide very wide limits with respect to the number and type of components which can be detected. However, even with such available methods, there are many analytical problems wherein an efficient method of infrared multicomponent analysis would be preferred. Thus, where three or more components are desired to be detected in a gas mixture and in case the gas chromotography method is too slow or too inaccurate for the purpose, or the mass spectroscopy method needs too high a requirement with respect to measuring procedures. Such a condition exists, for example, in the examination of the degasification process undergone by coals, and it is desired to determine the velocity of formation of the several gaseous decomposition products during the heating of a coal sample.

SUMMARY OF THE INVENTION

The invention provides a device for multicomponent gas analysis using a nondispersive infrared procedure, wherein the optical-pneumatic effect, produced by the absorption of specific bands of infrared radiations by individual components of a gas mixture, is measured. The device provides a means whereby only a very small portion of the gas mixture is required for the measurement, and is particularly advantageous in analytical measurements of flowing gases since all the gas flow need not be passed through the measuring chamber as is the case with other prior art devices.

The device of this invention is adapted to dampen pneumatic interference impulses present in measuring systems for gases, especially flowing gases.

The device accomplishes the above by being provided with means for permitting diffusion of a small portion of the gas mixture to be measured into a measuring chamber. The diffusion rate of the gas into the measuring chamber is predetermined by the use of porous materials. By the use of the porous materials, the momentary optical-pneumatic effect produced in the measuring chamber is not affected.

The device is capable of being selective to the various individual gas components of a gas mixture by means of optical filters. The concentration of the radiation within a small measuring chamber volume, on the order of a few tenths of a cubic centimeter, makes it possible to achieve a high degree of measuring sensitivity with a wide extension of the measuring range. The measurement is accomplished with a small consumption of the gas mixture to be analyzed and the response time is sufficient even in view of the fact that the gas mixture replenishment in the measuring chamber is by diffusion.

DETAILED DESCRIPTION OF THE INVENTION

The invention will be described and more fully understood by reference to the drawings which illustrate embodiments of the invention.

FIG. 1 shows schematically one embodiment of a gas analysis device according to the invention;

FIG. 2 shows a top view of the diaphragm wheel of the device of FIG. 1;

Figures 3, 4:
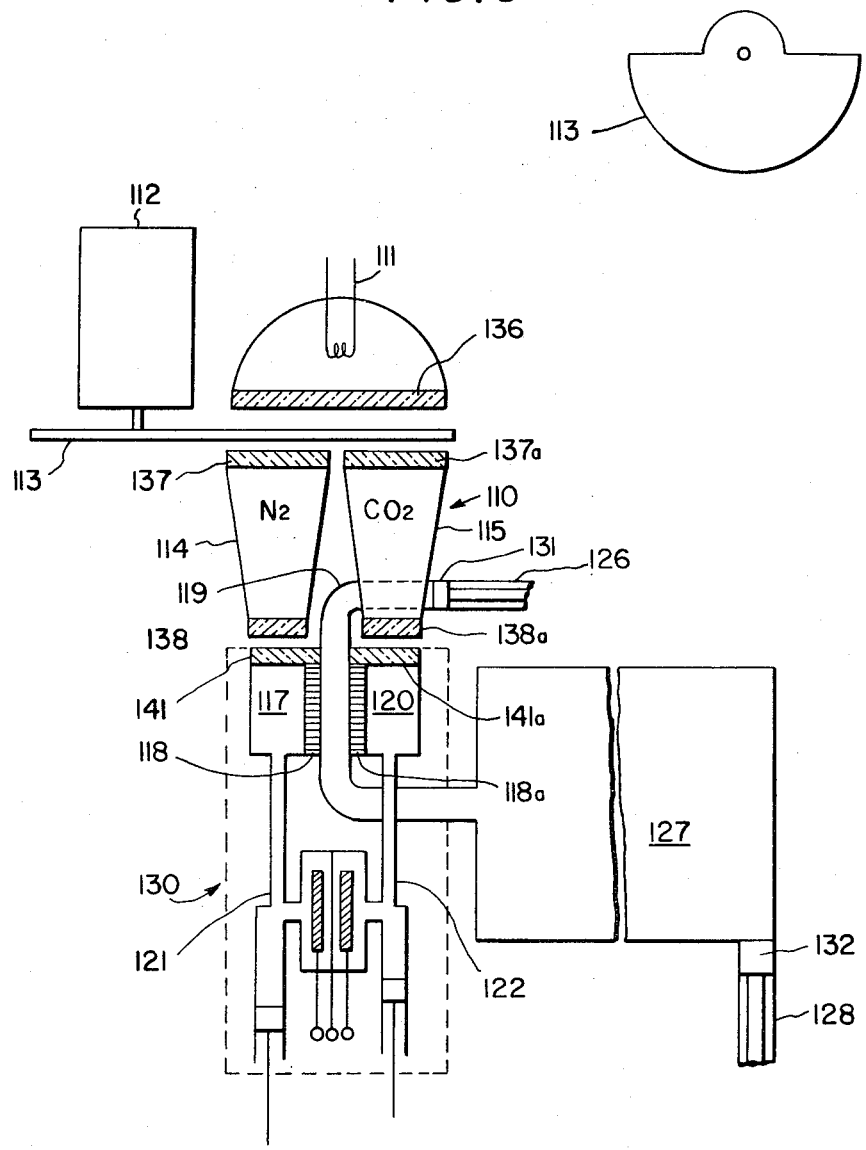
FIG. 3 shows a top view of an alternate diaphragm wheel to be used with the device of FIG. 1.
FIG. 4 shows another embodiment of the gas analysis device according to the invention.

Referring to the embodiment of FIG. 1, the numeral 10 generally indicates a cuvette unit and the numeral 30 a receiver unit. A radiation source 11 is optically aligned with the cuvette unit 10 and a diaphragm wheel or shutter 13 is disposed between them driven by motor 12 at a constant rotating speed.

The cuvette unit 10 comprises left and right semi-cuvettes 14 and 15, and a diffuser or filter cuvette 16 having a conical configuration.

The receiver unit 30 which can be a block of metal and the like comprises a measuring chamber 17 disposed in optical alignment with the cuvette unit 10. The bottom of the chamber 17 comprises a disc 18 of a porous material such as a sintered metal connected directly to a duct 19 through which the gas to be measured is carried. An identical comparison chamber 20 is disposed symmetrically to the chamber 17 and also comprises a disc 18a of porous material connected directly to the duct 19.

Channels 21 and 22 connect chambers 17 and 20 respectively with a measuring twin diaphragm condenser 23 which serves to measure the pressure difference between the two chambers. Adjustable buffer volumes 24 and 25 are provided on both sides of the condenser which serve to balance the pneumatic time constants on both sides of the diaphragm from the effects of pneumatic interference impulses which still remain in spite of the symmetry of the measuring system.

The gas to be measured or analyzed flows into duct 19 from capillary 26 and then into a buffer volume chamber 27 from which it discharges through capillary 28. Porous materials such as porous metal plates 31 and 32 are employed for feeding and discharging the gas, which further dampen the effects of pneumatic interference impulses.

The signals obtained from the condenser 23 are fed to an amplifier and measuring instruments (not shown) from the diaphragm 33 and the two counter electrodes 34 and 35.

In the optical alignment of the system, there are provided radiation permeable windows 36, 37, 38, 39, 40, and 41.

The use of the device is particularly adaptable to degasification processes wherein several gaseous decomposition products are formed and it is desired to measure the velocity of formation of one or more of the products. For example, in the degasification of coals, it may be desired to measure the concentration of one or all of the components of the various gases being evolved, such as $CO$, $CO_2$, $CH_4$, etc.

In order to sensitize the device to a specific gas, such as for example, $CO_2$, cuvette 15 is filled with $CO_2$ and cuvette 14 is filled with nitrogen. Filter cuvette 16 is filled with all the components in the gas mixture which absorb the specific radiation to be used, except the component to be measured, in this case, $CO_2$. With exact symmetry of the device, the radiation entering measuring chamber 17 is modulated only in the range of the absorption bands of the sensitizing gas, i.e., $CO_2$. Since the pneumatic measuring system responds only to alternating pressures, pneumatic signals are produced when radiations are alternately passed through cuvettes 14 and 15 by the rotation of wheel 13 or 13a, and are absorbed in chamber 17 in relation to the concentration of the specific gas for which the device is sensitized, i.e., $CO_2$.

The radiations used are preferably infrared radiations and the radiation-absorbing gas for which the device is sensitized will absorb only a very small wavelength range of the total radiation emitted by the radiation source 11. When radiations pass through cuvette 15, the $CO_2$ absorbs practically all the radiation within the absorption bands of $CO_2$, whereas radiations passing through cuvette 14, containing nonabsorbing nitrogen, are unweakened. As radiations pass from cuvette 14 into the filter cuvette 16, which does not contain any $CO_2$, radiations which may be absorbed by the gasses other than $CO_2$ are filtered in order that they may not be absorbed in the gas to be measured flowing through duct 19 and entering chamber 17. Radiations passing through cuvette 14 and filter cuvette 16 will contain no radiations which will be absorbed by the gas mixture in 17 because all the pertinent radiations will have been previously absorbed.

Accordingly, radiations passing into chamber 17 from cuvette 15 are only absorbed by the $CO_2$ content of the gas therein. Thus, the gas mixture in 17 is heated in accordance with its $CO_2$ content which results in a pressure rise.

As the radiations emitted by 11 are alternately passed through cuvettes 14 and 15 a pressure difference will result in chamber 17 which will vary in accordance with the $CO_2$ content of the gas which has entered chamber 17 from duct 19. Gas from duct 19 also enters chamber 20 which does not receive any radiations. Accordingly, the gas pressure in both chambers 17 and 20 are the same except when radiations enter chamber 17. The pressure differences which result in the two chambers are measured by the diaphragm condenser 23, which responds to the alternating pressures. The pneumatic signals are produced by the absorption of radiation in chamber 17 corresponding to the $CO_2$ content. The signals are converted into periodic capacitance variations in the usual manner, amplified and recorded by usual means.

The decided advantage of the above described system is the fact that no pressure differences occur between chambers 17 and 20 due to fluctuations in the gas flow through duct 19. The same static pressure is always automatically attained in both chambers because the gas replenishing the chambers for measuring purposes from duct 19 enters by diffusion through porous discs 18 and 18a. Thus, the total gas flow does not pass directly through the measuring chambers as is the case with prior systems using capillaries and therefore, the difficulties mentioned heretofore do not occur.

The rate of diffusion of gas through discs 18 and 18a depends substantially only on the sum of the areas of all the pores. The discs can be manufactured in thicknesses as small as 0.1 mm. Porous plates can be manufactured wherein the sum of the pore areas is 20 percent of the surface of the plate. The decisive factor, however, is that the total pore area has little dependence on the size of the individual pore area. Thus, if a porous plate is used having a surface area of 1 $cm^2$, a diffusion is produced as if an opening of 1/5 $cm^2$ were present. Through such an opening, using measuring chambers having a small volume of about 1 cc., the gas exchange between the duct and chambers takes place by means of diffusion within a few seconds.

The diffusion of the gas mixture from duct 19 into the chambers takes place with a time constant $$T_D = (e \cdot V)/(D \cdot nF)$$

$V$ = chamber volume
$D$ = diffusion constants
$e$ = thickness of the porous body
$n$ = pore number
$F$ = individual pore area The equalization of the pressure resulting through radiation absorption takes place with a time constant $$T_{PE} = (H \cdot \mu \cdot e \cdot V)/(n \cdot F^2)$$

$H$ = constant factor
$\mu$ = viscosity of the gas

As the product $n \cdot F$ shows, the total pore area is independent of the pore-diameter $d$ where the structure of the porous material is constant in total pore area. The diffusion time constant remains practically constant with decreasing pore-diameter, while the pneumatic time constant increases proportionally with $1/F$. Tests have shown that with a porous material of pore diameter of about 1 $\mu$m value, one attains the time constants suitable for the device of the invention and its purposes. Thus, for example, there occurs with a chamber volume of 0.5 cm$^3$, a pore area of 1 cm$^2$ of a porous material being 3 mm. thick and bout 1 $\mu$m pore diameter, a diffusion time constant of 5 sec and a pneumatic time constant of 0.1 sec, which with a modulation frequency of 6 Hz occasions a signal loss of only a few percent.

The porous discs also have the advantage that the increased pressure produced in chamber 17 by absorption of the radiation and heating of the gas is not equalized through the porous discs during the short radiation pulses of about 1/10 second.

In accordance with Poiseuille's law, the flow resistance of an individual pore is inversely proportional to the square of the pore area. Thus, a reduction of the pore diameter to one-tenth and keeping the pore area constant, increases the flow resistance by a factor of 100. Therefore, if the pore diameter is selected to be sufficiently small, the diffusion rate of the gas through the porous walls can be selected to accommodate a desired gas diffusion from the duct 19 into the chambers, while at the same time avoiding the effects of fluctuations of gas flow in the duct and loss of any of the pulsating pressure in chamber 17 produced by the absorption of radiation.

Porous metallic plates or discs are commercially available which have a pore diameter of 0.0002 mm. which are satisfactory to meet the above required conditions.

Referring to FIG. 4, another embodiment of the device of the invention is shown. The numeral 110 generally indicates a cuvette unit and the numeral 130 a receiver unit. A radiation source 111 is optically aligned with the cuvette unit 110 and a diaphragm wheel or shutter 113 is disposed between them driven by motor 112 at a constant rotating speed. The cuvette unit 110 comprises a pair of cuvettes 114 and 115.

The receiver unit 130, which can be a block of metal and the like, comprises a chamber 117 disposed in optical alignment with cuvette 114. Chamber 117 comprises a disc 118 of porous material connected directly to a duct 119 through which the gas to be measured is carried. An identical chamber 120 is disposed symmetrically to chamber 117 on the opposite side of duct 119 and in optical alignment with cuvette 115. Chamber 120 comprises a disc 118$a$ of porous material connected directly to duct 119. Channels 121 and 122 connect chambers 117 and 120 respectively with a measuring twin diaphragm condenser unit which is of the same construction and operation as the condenser 23 shown and described in connection with the embodiment of FIG. 1.

The gas to be measured or analyzed flows from capillary 126 through porous plate 131 into duct 119 and then into buffer volume chamber 127 from which it discharges through porous plate 132 and capillary 128.

In the optical alignment of the system, there are provided radiation permeable windows 136,137,137$a$,138,138$a$,141, and 141$a$.

The operation and sensitization of the device of FIG. 4 is similar to the device of the embodiment of FIG. 1. Cuvette 115 is filled with the specific infrared absorbing gas, e.g. $CO_2$ and cuvette 115 with a nonabsorbing gas, e.g. nitrogen. When radiations are passed through cuvette 115, the $CO_2$ absorbs practically all the radiations within the absorption bands of $CO_2$, whereas radiations passing through cuvette 114 are unweakened.

Radiations passing from cuvette 114 into chamber 117 are absorbed by the $CO_2$ content of the gas in chamber 117 which has diffused therein through porous plate 118 from duct 119. Radiations passing from cuvette 115 into chamber 120 will not be absorbed by the $CO_2$ content of the gas in chamber 120 because the $CO_2$ in cuvette 115 has already absorbed the pertinent radiations.

As radiations emitted by 111 are alternately passed through cuvettes 114 and 115, by rotating wheel 113, a periodic pressure increase will result in chamber 117 giving a pulsating signal which will vary in accordance with the $CO_2$ content of the gas flowing in duct 119 and diffusing into chambers 117 and 120. This pulsating signal is obtained from the diaphragm condenser unit as described heretofore.

The unique construction of the device providing for diffusion of gases into the chambers with the attendant advantages set forth is based on the fact that the diffusion time constant remains the same independent of the cross-sectional area of the individual pores, when the cross-sectional area of the total pores is constant. However, the pneumatic time constant increases inversely proportionally to the cross-sectional area of the individual pore. Thus, it is possible to have rapid gas replenishment in the chambers by diffusion, but the compensation of the pressure in the chamber, which increases by absorption of radiation, is sufficiently slow in relation to the duration of the radiation.

FIGS. 3 and 4 illustrate diaphragm wheels that may be used to modulate the infrared radiations passing through the adjacent cuvettes and the measuring chambers.

The device is adapted to be sensitized to a plurality of individual gases contained in a gaseous composition. Thus, a plurality of cuvette units 10, each sensitized to an individual gas, can individually be brought into position between the radiation source 11 and the receiver unit 30.

What is claimed is:

1. A device for the detection and measurement of a gas contained in a gas mixture by means of the optical-pneumatic effect produced by the absorption of radiation, comprising the following means in optical alignment:

a. radiation and filter means,
b. a pair of adjacent cuvettes, one of which contains the gas to be detected and the second of which contains a nonradiation absorbing gas,
c. receiver means comprising a measuring chamber and a comparison chamber,
d. duct means conducting said gas mixture through said receiver means between said measuring and comparison chambers, e. porous means disposed between said duct and said measuring and comparison chambers for diffusing a portion of said gas mixture from said conduit to said chambers, and f. pressure differential measuring means.

2. The device of claim 1 wherein filter cuvette means is disposed between said receiver means and said adjacent cuvettes.

3. The device of claim 1 wherein said duct means comprises capillary and porous means at the entrance and discharge portions of said receiver means.

4. The device of claim 1 wherein said pressure measuring means comprises diaphragm condenser means and adjustable balance control means disposed on each side of said condenser.

5. The device of claim 1 wherein said porous means comprises sinter metal and is dimensioned with respect to pore diameter and pore number whereby gas exchange takes place rapidly through diffusion and differential pressure building up during a radiation period remains approximately maintained.

6. The device of claim 1 wherein said duct means comprises buffer volume means.

7. The device of claim 1 wherein said radiation means comprises diaphragm wheel means.

8. The device of claim 1 wherein said comparison chamber is not in optical alignment.

* * * * *